United States Patent [19]
Prigent et al.

[11] Patent Number: 5,905,106
[45] Date of Patent: May 18, 1999

[54] COMPOSITION THAT IS EXTRUDABLE AND CURABLE IN AIR

[75] Inventors: Madeleine Prigent, Marcoussis; Alain Chaillie, Bruyeres le Chatel, both of France

[73] Assignee: Alcatel Alsthom Compagnie Generale D'Electricite, Paris, France

[21] Appl. No.: 08/842,531

[22] Filed: Apr. 15, 1997

[30] Foreign Application Priority Data

Apr. 16, 1996 [FR] France ................................. 96 04723

[51] Int. Cl.$^6$ .............................. C08G 81/02; C08K 5/54; C08L 9/02
[52] U.S. Cl. ..................... 524/430; 524/433; 524/437; 524/447; 524/449; 524/547; 524/548; 524/576; 524/581
[58] Field of Search ..................... 524/430, 433, 524/437, 447, 449, 547, 548, 576, 581; 525/64, 65, 66, 68, 69, 70, 71, 72, 74, 77, 78, 79, 80

[56] References Cited

U.S. PATENT DOCUMENTS

| | | | |
|---|---|---|---|
| 4,289,860 | 9/1981 | Glander et al. | 525/263 |
| 4,798,864 | 1/1989 | Topcik | 525/71 |

FOREIGN PATENT DOCUMENTS

| | | |
|---|---|---|
| 0181735A1 | 5/1986 | European Pat. Off. . |
| 0324430A1 | 7/1989 | European Pat. Off. . |
| 0580076A2 | 1/1994 | European Pat. Off. . |

*Primary Examiner*—Frederick Krass
*Attorney, Agent, or Firm*—Sughrue, Mion, Zinn, Macpeak & Seas, PLLC

[57] ABSTRACT

The composition is constituted by a mixture comprising a thermoplastic material, a hydrolysable silane compound, an elastomer, and a peroxide, said thermoplastic material and said silane compound carrying respective groups that react with each other. The composition including a filler containing superficial hydroxyl groups. The composition is suitable for sheathing electric cables and wires.

9 Claims, No Drawings ial high density polyethylene, vinyl triethoxy silane,
COMPOSITION THAT IS EXTRUDABLE AND CURABLE IN AIR The present invention relates to compositions that are extrudable and curable in air, of the type including a thermoplastic polymer material and an elastomer.

BACKGROUND OF THE INVENTION

Document EP-A-0324430 discloses a composition that is extrudable and curable, comprising a continuous matrix of a thermoplastic polymer material containing hydrolysable silane groups and fine particles of a vulcanized (or cured, or cross-linked) rubber which are dispersed in said continuous matrix.

The extruded composition is cured in the presence of water. It then presents excellent mechanical properties and is very temperature stable because of its curing. It can be used particularly, but not exclusively, for making the sheaths of electric cables and wires.

According to that document, the thermoplastic polymer material containing the hydrolysable silane groups is preferably initially grafted by an unsaturated and hydrolysable silane compound. The thermoplastic polymer material used for silane grafting is, in particular, a polyethylene or a copolymer of ethylene and at least one $\alpha$ olefin containing 2 to 6 carbon atoms, or a copolymer of ethylene and an unsaturated ester of a carboxylic acid. The unsaturated and hydrolysable silane compound used may be, for example, vinyl trimethoxy silane, vinyl triethoxy silane, or a vinyl tri(methoxy and ethoxy) silane. It is grafted on the thermoplastic polymer material in the presence of a peroxide.

The material is cured by hydrolysis and condensation of the alkoxy groups. In order for such curing to take place, the sample is immersed in water at 90° C. containing a catalyst for condensing the silane groups. In another variant, the sample is stocked in moist air for several weeks to cure it. Under such conditions, curing is caused by a catalyst for condensation of silane groups, added in the form of a master mixture to the base composition.

In a variant, the thermoplastic polymer material containing the hydrolysable silane groups is a copolymer of at least one a monolefin preferably containing 6 to 8 carbon atoms, and a silane that is unsaturated and hydrolysable. A preferred such copolymer is an ethylene-vinyl silane copolymer.

In the majority of examples given in that document, the composition is fabricated in two steps: the first for grafting silane on the thermoplastic polymer material, and the second for dynamic curing of the rubber and for dispersion thereof in fine particles within the continuous matrix of the thermoplastic polymer material containing the hydrolysable silane groups.

In one of the examples given in that document, the composition is fabricated in a single step, by placing together in a mixer, a mixture of thermoplastic polymer material, hydrolysable unsaturated silane, and peroxide, in particular high density polyethylene, vinyl triethoxy silane, and peroxide, and a mixture of natural rubber with a vulcanizing agent, and processing them together at 180° C. for several minutes. Nevertheless, fabricating the composition in a single step in accordance with that example gives rise to the problem of reactional interference between firstly the thermoplastic polymer material and the elastomer and secondly the other ingredients of the two mixtures. A priori, the properties of the composition fabricated in that way are not analogous to those of compositions fabricated by starting from the thermoplastic polymer material initially grafted with silane, but are substantially degraded relative thereto.

In document EP-A-0 181 735, the curable composition is composed of a nitrile rubber and a thermoplastic including hydrolysable silane groups. That composition is cured, as before, in the presence of water and of a catalyst for condensing the hydrolysable groups. In a variant, the thermoplastic contains polymerized units, and a hydrolysable silane compound is added to the mixture to react with the thermoplastic and to include hydrolysable silane groups in the thermoplastic. Curing takes place as before and is very lengthy.

OBJECTS AND SUMMARY OF THE INVENTION

A particular object of the present invention is to provide a composition of the above-specified types, which is made in a single step by avoiding, or at least minimizing in satisfactory manner, said problem of reactional interference, which is cured in air, which cures quickly, and which does not require the presence of a catalyst for condensing hydrolysable groups, which has the expected properties, and advantageously has additional properties, and which is recyclable.

The invention provides a composition that is extrudable and curable in air, the composition being constituted by a mixture comprising a thermoplastic polymer material, a hydrolysable silane compound, a non-cured elastomer, and a curing agent, said thermoplastic polymer material and said hydrolysable silane compound respectively carrying reactive groups for selective reaction between the thermoplastic polymer material and the silane compound, the composition including a filler containing superficial hydroxyl groups for reacting with the hydrolysable groups of the silane compound, while said elastomer is cured dynamically and selectively by said curing agent.

This composition, made in a single step, cures in air in a few hours and is recyclable.

One of the special features of this composition lies in the choice of basic ingredients therefor, i.e. the thermoplastic polymer material and the elastomer which, in the presence of the silane used and of the curing agent, have specific and different reaction kinetics in said mixture.

The thermoplastic polymer material carrying its reactive functional groups is a material that is stable and commercially available.

In one of the preferred ways of fabricating the composition, the thermoplastic polymer material is a maleic anhydride (MA) grafted polyethylene (PE), the elastomer is an ethylene-vinyl acetate (EVA) copolymer, the silane compound is a silane aminoalkoxyl, the filler is magnesia, and the curing agent is a peroxide. The amine groups of this silane compound will react selectively with the maleic anhydride groups of the PE. The EVA is dynamically cured by the peroxide route, without substantial interference between peroxide and the MA grafted PE, because of the difference in their curing kinetics. The magnesia will react with the alkoxy groups of the silane compound, thereby activating air curing of the composition. It also improves the thermomechanical properties of the cured composition and gives it fire-resistant properties.

Advantageously, the proportion by weight of EVA in the mixture is greater than that of MA grafted PE. The curing dynamics ensure stability of the elastomer properties of the composition, both with respect to shear forces during dynamic curing for dispersion in the matrix or continuous phase of the thermoplastic, and during subsequent recycling of the air-cured composition.

Tests have been performed by putting the MA grafted PE, the EVA, and the magnesia together into an internal mixer, by blending them together while heating to obtain a homogeneous mixture, then adding the aminoalkoxyl silane, and then the peroxide, while continuing heating, and while simultaneously imparting a high degree of shear for several minutes. Such tests have been entirely satisfactory.

It has been observed that the compositions which have been made in this way and then extruded, cure in surprising manner and very quickly in ambient air. Articles made of such compositions have high resistance to creep with temperature, only a few hours after being made, and are entirely suitable for being recycled.

MORE DETAILED DESCRIPTION

In the composition, the fractions by weight, expressed in percentage terms relative to the mixture of the thermoplastic polymer material with the elastomer may be as follows:

for the thermoplastic polymer grafted with its reactive functional groups, 5 parts to 75 parts, and preferably 10 parts to 30 parts;

for the elastomer, 25 parts to 95 parts and preferably 70 parts to 90 parts;

for the silane compound, 0.5 parts to 5 parts and preferably 0.7 parts to 2.5 parts; and for the peroxide, 0.5 parts to 7 parts, and preferably 0.5 parts to 3 parts.

The quantity of inorganic filler may lie in the range 10 parts to 230 parts for 100 parts of thermoplastic polymer and elastomer mixture, and preferably in the range 150 parts to 200 parts, depending on the level desired for the additional properties.

In a variant, the inorganic filler used may be alumina, kaolin, or mica, instead of being magnesia, so as to react like magnesia on the alkoxy groups of the hydrolysable silane compound. Chalk or carbon black can also be added to the mixture, but they will have little influence on the thermomechanical properties of the mixture insofar as they do not react with alkoxylsilane.

The thermoplastic polymer material may be MA grafted PE as mentioned above, and more particularly it may be MA grafted high density PE (hdPE) or linear PE, or in a variant it may be a copolymer of ethylene such as an MA grafted EVA, or an MA grafted ethylene propylene rubber (EPR), or a polypropylene (PP), or a copolymer of PP.

In another variant, the maleic anhydride reactive functional groups grafted on the thermoplastic polymer material can be replaced by other functional groups, such as other anhydride groups or epoxy, amine, carboxylic acid, or alcohol groups in particular, suitable for reacting with appropriate amine or other groups carried by the hydrolysable silane compound.

By way of example, if the thermoplastic polymer material is grafted with epoxy functional groups, any silane compound including terminal groups of primary or secondary amine, carboxylic acid, alcohol, or mercaptan, in particular, can be used. If the thermoplastic polymer material is grafted with amine functional groups, then the silane compound will include groups that react with the amine group.

In particular, the thermoplastic polymer material may be an acrylic acid grafted EPR, or an acrylic acid grafted EVA, or a copolymer of ethylene and of alkyl acrylate including epoxy groups.

In a variant, instead of using EVA, the elastomer may be selected in particular from ethyl butyl amine (EBA), ethylene ethyl acrylate (EEA), ethylene methacrylic acid (EMA), ethylene-propylene diene monomer (EPDM), ethylene-propylene rubber (EPR), or more generally copolymers based on ethylene or propylene mixtures such as those commonly used in the electric cable industry.

The peroxide agent for dynamic curing of the elastomer can also vary accordingly, depending on the nature of the elastomer, providing it causes selective curing of the elastomer. Thus, for example, if the elastomer used is an EPDM, the curing agent is selected from peroxide compounds, phenol resins, and sulfur derivatives, in particular.

Various formulations of the composition are given in the following table, specifying the number of parts for each ingredient per 100 parts of the mixture of thermoplastic polymer with the elastomer, together with properties of breaking strength R, expressed in MPa, breaking elongation A, expressed in %, and resistance to creep or deformation at 200° C., D, and remanent deformation Dr, both expressed in %, together with the limit oxygen index LOI for each formulation.

TABLE

|  | PARTS | PARTS | PARTS | PARTS |
| --- | --- | --- | --- | --- |
| hdPE - MA | 20 |  |  |  |
| EPR - MA |  | 20 |  |  |
| EVA - MA |  |  | 20 |  |
| linear PE - MA |  |  |  | 20 |
| EVA (26% VA) | 20 | 20 | 20 | 20 |
| EVA (40% VA) | 60 | 60 | 60 | 60 |
| Hydrated magnesia | 150 | 150 | 150 | 150 |
| Aminoalkoxy silane | 2 | 2 | 2 | 2 |
| Peroxide | 2 | 2 | 2 | 2 |
| Antioxidizer | 0.5 | 0.5 | 0.5 | 0.5 |
| R (MPa) | 15.7 ± 1.1 | 13.1 ± 0.6 | 14.1 ± 0.2 | 15.5 ± 0.8 |
| A (%) | 166 ± 11 | 234 ± 6 | 202 ± 8 | 187 ± 10 |
| D (%) | 40 | 60 | 85 | 60 |
| Dr (%) | 3 | 14 | 29 | 19 |
| LOI | 37 | 38 | 39 | 38 |

We claim:

1. A composition that is extrudable and curable in air, the composition comprising a mixture comprising a thermoplastic polymer material, a hydrolysable silane compound, which contains alkoxy group(s), a non-cured elastomer which is at least one of an ethylene copolymer or a propylene copolymer, and a curing agent, said thermoplastic polymer material and said hydrolysable silane compound respectively carrying reactive groups for selective reaction between the thermoplastic polymer material and the silane compound, the composition including a filler containing surface hydroxyl groups capable of reacting with alkoxy groups of the silane compound in the mixture and under the extrusion and curing conditions used, and wherein said elastomer is capable of being cured dynamically and selectively by said curing agent in said mixture.

2. A composition according to claim 1, wherein the reactive groups carried by said thermoplastic polymer material are selected from the group consisting of anhydride, epoxy, amine, acid, and alcohol functions.

3. A composition according to claim 1, wherein the reactive groups carried by said hydrolysable silane compound are selected from the group consisting of amine, carboxylic acid, alcohol, and mercaptan functions.

4. A composition that is extrudable and curable in air, the composition comprising a mixture comprising a thermoplastic polymer material, a hydrolysable silane compound, which contains alkoxy group(s) a non-cured elastomer which is at least one of an ethylene copolymer or a propylene copolymer, and a curing agent, said thermoplastic polymer material and said hydrolysable silane compound respectively carrying reactive groups for selective reaction between the thermoplastic polymer material and the silane compound, the composition including a filler containing surface hydroxyl groups capable of reacting with alkoxy groups of the silane compound in the mixture and under the extrusion and curing conditions used, and wherein said elastomer is capable of being cured dynamically and selectively by said curing agent in said mixture, wherein the reactive groups are respectively maleic anhydride functions in one case and amine functions in the other.

5. A composition according to claim 1, wherein said thermoplastic polymer is selected from a polyethylene, an ethylene copolymer, a polypropylene, a propylene copolymer, or an ethylene propylene copolymer.

6. A composition according to claim 1, wherein said curing agent is selected from the group consisting of a peroxide, a phenolic resin, and a sulfur derivative.

7. A composition according to claim 1, wherein said filler is selected from magnesia, alumina, kaolin, or mica.

8. A composition according to claim 1, comprising 5 parts to 75 parts of said thermoplastic material, 25 parts to 95 parts of said elastomer, 0.5 parts to 5 parts of the silane compound, 0.5 parts to 7 parts of said curing agent, and 10 parts to 230 parts of said filler per 100 parts of said thermoplastic polymer material with said elastomer in said mixture.

9. A composition according to claim 8, comprising 10 parts to 30 parts of said thermoplastic polymer, 70 parts to 90 parts of said elastomer, 0.7 parts to 2.5 parts of the silane compound, 0.5 parts to 3 parts of said curing agent, and 150 parts to 200 parts of said filler.

\* \* \* \* \*